(12) United States Patent
Ju et al.

(10) Patent No.: US 10,692,423 B2
(45) Date of Patent: Jun. 23, 2020

(54) BACKLIGHT LIGHT EMITTING DIODE ARRANGEMENT METHOD

(71) Applicant: Jun Ju, Jiangsu (CN)

(72) Inventors: Jun Ju, Jiangsu (CN); Zhengyan Jiang, Jiangsu (CN); Yaming Huang, Jiangsu (CN)

(73) Assignee: Jun Ju, Jiangsu (CN)

( * ) Notice: Subject to any disclaimer, the term of this patent is extended or adjusted under 35 U.S.C. 154(b) by 0 days.

(21) Appl. No.: 16/316,625

(22) PCT Filed: Sep. 15, 2017

(86) PCT No.: PCT/CN2017/101892
§ 371 (c)(1),
(2) Date: Jan. 10, 2019

(87) PCT Pub. No.: WO2018/188265
PCT Pub. Date: Oct. 18, 2018

(65) Prior Publication Data
US 2019/0295460 A1    Sep. 26, 2019

(30) Foreign Application Priority Data

Apr. 11, 2017   (CN) .......................... 2017 1 0230879

(51) Int. Cl.
*G09G 3/32* (2016.01)
*H05B 33/08* (2020.01)
(Continued)

(52) U.S. Cl.
CPC ................. *G09G 3/32* (2013.01); *G09F 9/33* (2013.01); *H05B 45/00* (2020.01)

(58) Field of Classification Search
CPC .............................. G09G 3/32; H05B 33/0806
See application file for complete search history.

(56) References Cited

U.S. PATENT DOCUMENTS

| 8,115,891 B2 * | 2/2012 | Ota | .................. | G02F 1/133611 349/64 |
| 8,783,931 B2 * | 7/2014 | McCollum | ........... | G02B 6/0031 362/231 |

(Continued)

FOREIGN PATENT DOCUMENTS

| CN | 101581420 | 11/2009 |
| CN | 101839423 | 9/2010 |

(Continued)

OTHER PUBLICATIONS

"International Search Report (Form PCT/ISA/210)", dated Jan. 12, 2018, with English translation thereof, pp. 1-4.

*Primary Examiner* — Kwang-Su Yang
(74) *Attorney, Agent, or Firm* — JCIPRNET

(57) ABSTRACT

The present invention provides a backlight light emitting diode arrangement process, which comprises the following steps: (1) determining a number Z of a backlight light emitting diode; (2) determining a distribution region of the backlight light emitting diode according to a space calculation formula, the space calculation formula comprising $Y \times A = Y \times F \times Q$ %, $A = Q$ %$\times F$, and $A + F = (X/Z) \times 2$; (3) further calculating distribution sizes of intermediate regions B, C, D and E using a gradually widened average value obtained through a formula $(F-A)/(Z/2-1)$ according to the A and F calculated in step (2); (4) calculating a specific position of the backlight light emitting diode; and (5) drawing a ladder diagram.

6 Claims, 5 Drawing Sheets

(51) Int. Cl.
G09F 9/33 (2006.01)
H05B 45/00 (2020.01)

(56) References Cited

U.S. PATENT DOCUMENTS

| 2011/0026241 | A1 | 2/2011 | Kim et al. |
| 2011/0205145 | A1* | 8/2011 | Lin ..................... G02B 6/0068 345/102 |
| 2014/0009965 | A1* | 1/2014 | Takase .............. G02F 1/133615 362/613 |

FOREIGN PATENT DOCUMENTS

| CN | 202915104 | 5/2013 |
| CN | 103499072 | 1/2014 |
| CN | 106847113 | 6/2017 |

\* cited by examiner

BACKLIGHT LIGHT EMITTING DIODE ARRANGEMENT METHOD

CROSS-REFERENCE TO RELATED APPLICATION

This application is a 371 application of an international PCT application serial no. PCT/CN2017/101892, filed on Sep. 15, 2017, which claims priority to and the benefit of China Patent Application No. CN201710230879.2, filed on Apr. 11, 2017. The entirety of each of the above-mentioned patent applications is hereby incorporated by reference herein and made a part of this specification.

TECHNICAL FIELD

The present invention relates to the field of light emitting diode technologies, and more particularly, to a backlight light emitting diode arrangement process, which enables a brightness of the backlight light emitting diode to be distributed uniformly.

BACKGROUND

Since a light emitting diode has the advantages of strong expansibility, high brightness, long life and energy conservation, a light emitting diode screen is widely used. At present, when the light emitting diode is used as a backlight scheme, the light emitting diode elements are only simply partitioned instead of being specifically arranged, and light crosstalk between adjacent partitions is not considered or rarely considered, so that a display effect is reduced. In traditional arrangement, regarding to an area of a backlight light emitting region, and according to a number of the backlight light emitting diodes, a sharing area of each backlight light emitting diode is arranged uniformly, and the backlight light emitting diode is mounted at a center of an end portion of the sharing area. This process method of average distribution seems to make the brightness distribution even, but the light crosstalk between adjacent partitions is actually not considered, and in actual use, a middle portion will be brighter than an edge portion, and the brightness distribution is uneven.

SUMMARY

The present invention is intended to provide a backlight light emitting diode arrangement process, which enables a brightness of the backlight light emitting diode to be distributed uniformly, thereby solving the technical problem above.

In order to achieve the technical object above and reach the technical requirement above, the technical solution used in the present invention is a backlight light emitting diode arrangement process, which comprises the following steps:

(1): determining a number Z of a backlight light emitting diode;

(2): determining a distribution region of the backlight light emitting diode according to a space calculation formula, the space calculation formula comprising $Y \times A = Y \times F \times Q\%$, $A = Q\% \times F$, and $A + F = (X/Z) \times 2$;

(3): further calculating distribution sizes of intermediate regions B, C, D and E according to the A and F calculated in step (2);

(4): calculating a specific arrangement position of the backlight light emitting diode (101); and (5): drawing a ladder diagram.

As a preferred technical solution: in step (1), the number Z of the backlight light emitting diodes is determined according to a size and an area of the backlight light emitting region.

As a preferred technical solution: the area is a product of X and Y.

As a preferred technical solution: the number Z is 1 to 1000.

As a preferred technical solution: in step (2), the X is divided into two partitions which comprise a left partition and a right partition; and the left partition and the right partition are symmetrical structures.

As a preferred technical solution: in step (2), the Y is a longitudinal width of the backlight light emitting region; the X is a transverse length of the backlight light emitting region; the A is a transverse length of a first partition on the left partition or a transverse length of a last partition on the right partition; the F is a transverse length of the last partition on the left partition or a transverse length of the first partition on the right partition; and the Q % is 75%.

As a preferred technical solution: in step (5), the ladder diagram is gradually extended and widened to the last partition from the first partition on the left partition, forming an included angle with the right partition.

As a preferred technical solution: in step (3), the distribution sizes of the intermediate regions B, C, D and E are calculated using a gradually widened average value obtained through a formula $(F-A)/(Z/2-1)$ according to numerical values of the A and F.

As a preferred technical solution: in step (3), the B is the A plus the average value; the C is the B plus the average value; the D is the C plus the average value; and the E is the D plus the average value.

As a preferred technical solution: in step (4), a position of the backlight light emitting diode is arranged at a transverse center position of the corresponding partition, and numerical values of I/2, J, K, L, M, N and P are obtained through estimation according to the data calculated in step (2) and step (3).

The present invention has the beneficial effects that: according to the backlight light emitting diode arrangement process, the accurate position of the backlight light emitting diode is determined by using the space calculation formula in combination with the ladder diagram which can intuitively see the distribution of the backlight light emitting diode, different angles are formed by changing sizes of the first partition and the last partition, and the density of the backlight light emitting diodes at the edge portion is controlled, thus improving light crosstalk, ensuring the brightness of the edge portion, and ensuring brightness distribution uniformity of the entire backlight emitting region.

Figure 1:
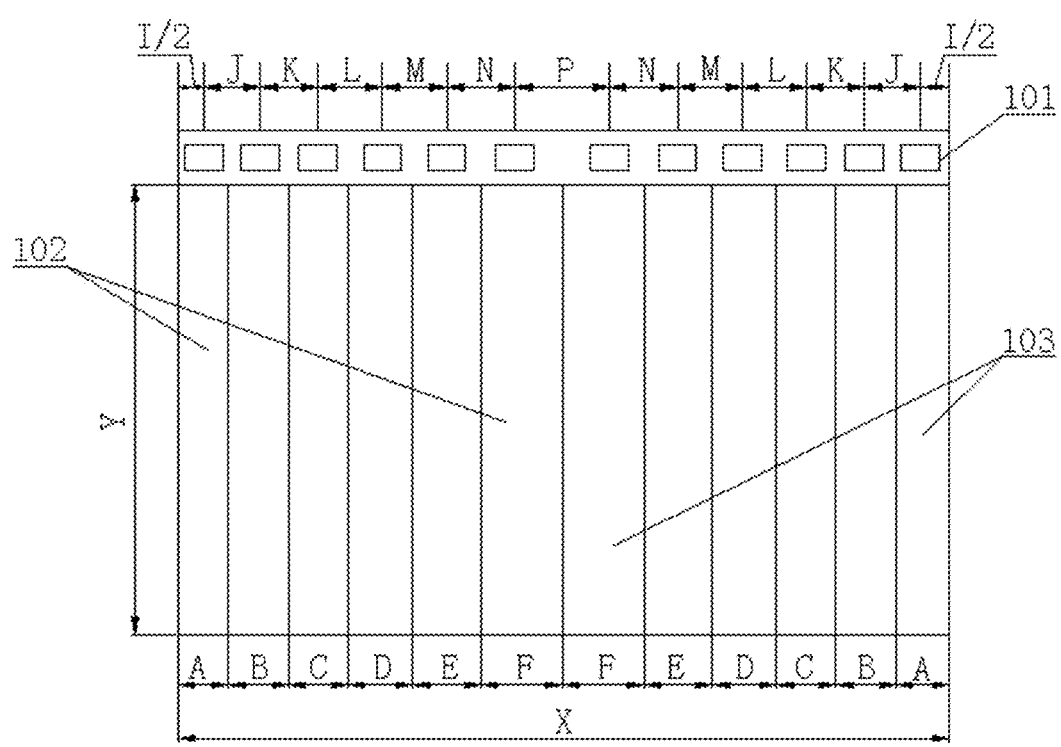
FIG. 1 is a diagram of backlight light emitting diode arrangement according to the present invention.

In the drawings: 101 refers to backlight light emitting diode, 102 refers to left partition, 103 refers to right partition, and 104 refers to included angle.

DETAILED DESCRIPTION

The present invention is further described hereinafter with reference to the drawing.

Figure 2:
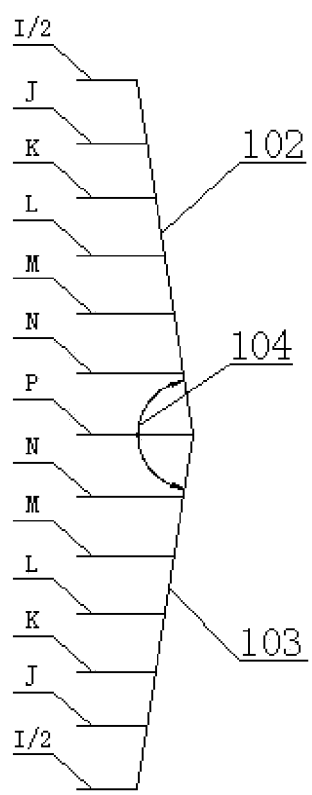
FIG. 2 is a ladder diagram of backlight light emitting diode arrangement according to the present invention.
Figure 3:
FIG. 3 is a ladder diagram of backlight light emitting diode arrangement of the prior art according to the present invention.
Figure 4:
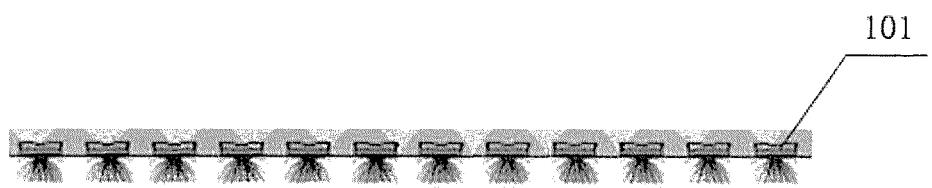
FIG. 4 is a diagram of use station of the backlight light emitting diode of the prior art according to the present invention.
Figure 5:
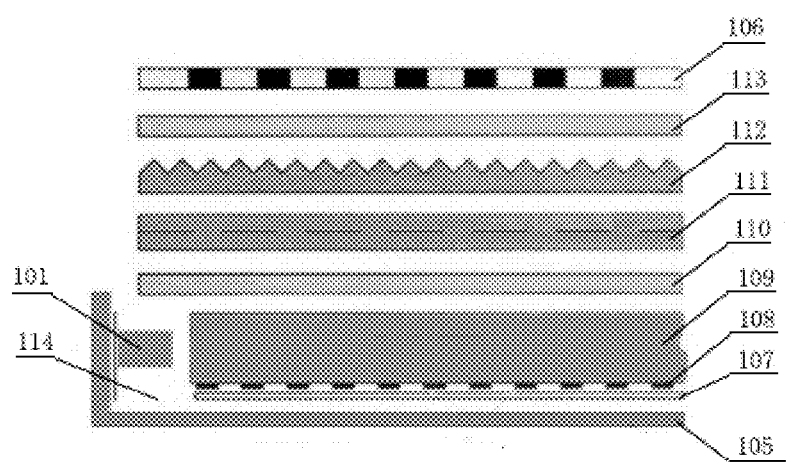
FIG. 5 is a structure diagram of backlight according to the present invention.

In FIG. 1 and FIG. 2: a backlight light emitting diode arrangement process comprises the following steps.

In step (1), a number Z of the backlight light emitting diode 101 is determined according to a size and an area of a backlight light emitting region, wherein the area is a product of X and Y; since Y is a longitudinal length of the backlight light emitting region, a distance and a brightness need to be considered regarding to a longitudinal length distance while selecting a specification of the backlight light-emitting diode 101, X is a transverse length of the backlight light-emitting region, and a size, a brightness, etc. of the backlight light-emitting diode 101 need to be considered while selecting the specification of the backlight light-emitting diode 101, and the number Z is 1 to 1000; a backlight structure also comprises a module frame 105 and a panel 106; a reflecting film 107, a dimming dot 108, a light guide plate 109, a lower diffuser 110, a lower light intensifier 111, an upper light intensifier 112, and an upper diffuser 113 are sequentially arranged between the module frame 105 and the panel 106; the backlight light emitting diode 101 is arranged in a space 114 formed by the module frame 105 with the reflecting film 107, the dimming dot 108, the light guide plate 109 and the lower diffuser 110; the backlight light emitting diode 101 emits light, transmits light through the light guide plate 109, distributes the light through the dimming dot 108 to make the light uniform, and then finally forms the backlight through the lower diffuser 110, the lower light intensifier 111, the upper light intensifier 112, and the upper diffuser 113.

In step (2), a distribution region of the backlight light emitting diode 101 is determined according to a space calculation formula, and the space calculation formula comprises: $Y \times A = Y \times F \times Q\%$, $A = Q\% \times F$, and $A+F=(X/Z) \times 2$.

In step (3), distribution sizes of intermediate regions B, C, D and E are further calculated according to the A and F calculated in step (2).

In step (4), a specific arrangement position of the backlight light emitting diode 101 is calculated; and a position of the backlight light emitting diode 101 is arranged at a transverse center position of corresponding partition, and numerical values of I/2, J, K, L, M, N and P are obtained through estimation according to data calculated in step (2) and step (3).

In step (5), a ladder diagram is drawn; and the distribution of the backlight light emitting diode 101 can be intuitively seen through the ladder diagram, different angles are formed by changing sizes of a first partition and a last partition, and a density of the backlight light emitting diode at an edge portion is controlled, thus improving light crosstalk, ensuring a brightness of the edge portion, and ensuring brightness distribution uniformity of the entire backlight emitting region.

In FIG. 1 and FIG. 2: the X is divided into two partitions which comprise a left partition 102 and a right partition 103 in step (2); the left partition 102 and the right partition 103 are symmetrical structures; the Y is a longitudinal width of the backlight light emitting region; the X is a transverse length of the backlight light emitting region; the A is a transverse length of a first partition on the left partition 102 or a transverse length of a last partition on the right partition 103; the F is a transverse length of the last partition on the left partition 102 or a transverse length of the first partition on the right partition 103; and the Q % is 75%.

In FIG. 2: the ladder diagram is gradually extended and widened to the last partition from the first partition on the left partition 102, forming an included angle 104 with the right partition 103 in step (5); and the smaller the included angle 104 is, the greater the difference between a value of A and a value of F is, the greater the difference between a value of I/2 and a value of P is, the higher the distribution density of the backlight light emitting diode 101 at the edge portion is, and the brighter the edge portion is; and the larger the included angle 104 is, the condition is opposite.

In FIG. 1: a gradually widened average value is obtained through a formula $(F-A)/(Z/2-1)$ according to numerical values of the A and F in step (3); and the B is the A plus the average value; the C is the B plus the average value; the D is the C plus the average value; and the E is the D plus the average value.

First embodiment: (the calculation result approximates to two decimal places, Z is in a unit of piece, and X, Y, A, F and other numerical values are in a unit of millimeters)

The value of X is 120, the value of Z is 12, and the value of Q % is 75%;

according to the space calculation formulas: $Y \times A = Y \times F \times Q\%$, $A = Q\% \times F$ and $A+F=(X/Z) \times 2$, the formulas are substituted into each other to obtain a formula: $Q\% \times F + F = (X/Z) \times 2$;

the data is further inserted to obtain $75\% \times F + F = (120/12) \times 2$;

the calculation is further conducted to obtain the value 11.43 of F;

the calculation is further conducted to obtain the value 8.57 of A according to $A = Q\% \times F$;

further, according to the gradually widened average value obtained through the formula $(F-A)/(Z/2-1)$, the data is further inserted to obtain the average value $(11.43-8.57)/(12/2-1)=0.57$;

the value 9.14 of B is further obtained;
the value 9.71 of C is further obtained;
the value 10.28 of D is further obtained;
the value 10.85 of E is further obtained;
the accurate position of the backlight light emitting diode 101 is further estimated, and the position of the backlight light emitting diode 101 is arranged at the transverse center position of the corresponding partition to obtain:

$$I/2=A/2=4.29;$$

$$J=A/2+B/2=4.29+4.57=8.86;$$

$$K=B/2+C/2=4.57+4.86=9.43;$$

$$L=C/2+D/2=4.86+5.14=10;$$

$$M=D/2+E/2=5.14+5.43=10.57;$$

$$N=E/2+F/2=5.43+5.72=11.15;$$

$$P=F/2+F/2=5.72+5.72=11.44.$$

The embodiments above are merely for clearly illustrating the present invention, and are not intended to limit the embodiments. Those skilled in the art may further make other changes or variations of different forms based on the description above, and it is not necessary and impossible to exhaust all embodiments here, while obvious changes or variations derived therefrom are still within the protection scope of the present invention.

What is claimed is:

1. A backlight light emitting diode arrangement process method, comprising the following steps:
   (1): determining a number Z of a backlight light emitting diode;
   (2): determining a distribution region of the backlight light emitting diode according to a space calculation formula, the space calculation formula comprising $Y \times A = Y \times F \times Q\%$, $A = Q\% \times F$, and $A+F=(X/Z) \times 2$;
   (3): further calculating distribution sizes of intermediate regions B, C, D and E according to the A and the F calculated in step (2);
   (4): calculating a specific arrangement position of the backlight light emitting diode; and
   (5): drawing a ladder diagram,
   wherein in step (1), the number Z of the backlight light emitting diode is determined according to a size and an area of the backlight light emitting region,
   wherein in step (2), the X is divided into two partitions which comprise a left partition and a right partition,
   wherein in step (2), the Y is a longitudinal width of the backlight light emitting region; the X is a transverse length of the backlight light emitting region; the A is a transverse length of a first partition on the left partition or a transverse length of a last partition on the right partition; the F is a transverse length of the last partition on the left partition or a transverse length of the first partition on the right partition; and the Q % is 75%,
   wherein in step (3), the distribution sizes of the intermediate regions B, C, D and E are calculated using a gradually widened average value obtained through a formula $(F-A)/(Z/2-1)$ according to numerical values of the A and the F,
   wherein in step (3), the B is the A plus the average value; the C is the B plus the average value; the D is the C plus the average value; and the E is the D plus the average value.

2. The backlight light emitting diode arrangement method according to claim 1, wherein the area is a product of the X and the Y.

3. The backlight light emitting diode arrangement method according to claim 1, wherein the number Z is 1 to 1000.

4. The backlight light emitting diode arrangement method according to claim 1, wherein the left partition and the right partition are symmetrical structures.

5. The backlight light emitting diode arrangement method according to claim 1, wherein in step (4), a position of the backlight light emitting diode is arranged at a transverse center position of the corresponding partition, and numerical values of I/2, J, K, L, M, N and P are obtained through estimation according to the data calculated in step (2) and step (3).

6. The backlight light emitting diode arrangement method according to claim 1, wherein in step (5), the ladder diagram is gradually extended and widened to the last partition from the first partition on the left partition, forming an included angle with the right partition.

* * * * *